US011964569B2

(12) United States Patent
Watanabe et al.

(10) Patent No.: US 11,964,569 B2
(45) Date of Patent: Apr. 23, 2024

(54) CONSTRUCTION MACHINE (71) Applicant: Hitachi Construction Machinery Co., Ltd., Tokyo (JP)

(72) Inventors: Toshihiko Watanabe, Ushiku (JP); Seiji Ishida, Hitachinaka (JP); Ken Takeuchi, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 661 days.

(21) Appl. No.: 17/260,614

(22) PCT Filed: Jul. 4, 2019

(86) PCT No.: PCT/JP2019/026656
§ 371 (c)(1),
(2) Date: Jan. 15, 2021

(87) PCT Pub. No.: WO2020/017348
PCT Pub. Date: Jan. 23, 2020

(65) Prior Publication Data
US 2022/0274487 A1 Sep. 1, 2022

(30) Foreign Application Priority Data

Jul. 19, 2018 (JP) .................... 2018-135797

(51) Int. Cl.
*B60L 3/00* (2019.01)
*B60L 3/04* (2006.01)
(Continued)

(52) U.S. Cl.
CPC ............... *B60L 3/0046* (2013.01); *B60L 3/04* (2013.01); *B60L 50/61* (2019.02); *B60L 53/22* (2019.02);
(Continued)

(58) Field of Classification Search
CPC ........ B60L 3/0046; B60L 50/61; B60L 53/22; B60L 3/04; B60L 2200/40;
(Continued)

(56) References Cited

U.S. PATENT DOCUMENTS

2010/0090628 A1 4/2010 Endo et al.
2012/0303397 A1* 11/2012 Prosser .................. B60L 53/18
705/7.12
(Continued)

FOREIGN PATENT DOCUMENTS

EP 2 275 299 A1 1/2011
JP 11-234910 A 8/1999
(Continued)

OTHER PUBLICATIONS

Extended European Search Report issued in European Application No. 19837450.6 dated Feb. 15, 2022 (nine (9) pages).

(Continued)

*Primary Examiner* — Mahmoud S Ismail
(74) *Attorney, Agent, or Firm* — Crowell & Moring LLP (57) ABSTRACT

In a case of a normal operation, a battery controller (22) assumes a normal operation mode and permits charging and discharging of a battery module (21). Upon receiving a discharge command from a vehicle body controller (17) for completely discharging the battery module (21), the battery controller (22) assumes a discharge mode to discharge the battery module (21) to reach a safe voltage level and store discharge information. Upon reading out the discharge information, the battery controller (22) assumes a discharge prohibition mode to prohibit charging and discharging of the battery module (21).

3 Claims, 8 Drawing Sheets (51) Int. Cl.
  *B60L 50/00* (2019.01)
  *B60L 50/61* (2019.01)
  *B60L 53/22* (2019.01)
  *E02F 9/20* (2006.01)
  *H01M 10/48* (2006.01)

(52) U.S. Cl.
  CPC ............ *E02F 9/207* (2013.01); *E02F 9/2091* (2013.01); *H01M 10/48* (2013.01); *B60L 2200/40* (2013.01); *B60L 2240/547* (2013.01); *B60L 2250/16* (2013.01)

(58) Field of Classification Search
  CPC  B60L 2240/547; B60L 2250/16; E02F 9/207; E02F 9/2091; H01M 10/48
  USPC .......................................................... 701/22
  See application file for complete search history.

(56) References Cited

U.S. PATENT DOCUMENTS

| | | | |
|---|---|---|---|
| 2013/0164109 A1* | 6/2013 | Yamazaki | E02F 9/2217 60/420 |
| 2014/0214250 A1* | 7/2014 | Murakami | B60L 53/55 701/22 |
| 2015/0046004 A1 | 2/2015 | Kitamura et al. | |
| 2017/0028980 A1* | 2/2017 | Ogawa | B60W 20/12 |
| 2018/0131204 A1* | 5/2018 | Weicker | B60L 58/15 |
| 2022/0037910 A1* | 2/2022 | Tikhonski | H02J 7/0032 |

FOREIGN PATENT DOCUMENTS

| | | |
|---|---|---|
| JP | 2013-169060 A | 8/2013 |
| JP | 2016-138403 A | 8/2016 |
| JP | 2018-113825 A | 7/2018 |
| WO | WO 2008/111649 A1 | 9/2008 |
| WO | WO 2015/011788 A1 | 1/2015 |

OTHER PUBLICATIONS

Korean-language Office Action issued in Korean Application No. 10-2021-7000630 dated May 20, 2022 with English translation (10 pages).

International Search Report (PCT/ISA/210) issued in PCT Application No. PCT/EP2019/026656 dated Aug. 27, 2019 with English translation (three (3) pages).

Japanese-language Written Opinion (PCT/ISA/237) issued in PCT Application No. PCT/EP2019/026656 dated Aug. 27, 2019 (three (3) pages).

* cited by examiner

CONSTRUCTION MACHINE

BACKGROUND

The present invention relates to construction machines, such as a hydraulic excavator.

There is known a hybrid excavator or a battery excavator, using an electricity storage device as a drive source. In such an excavator provided with the electricity storage device, an electric charge in the electricity storage device is required to be discharged to reach a safety voltage level and prevent an operator from getting an electrical shock power at the maintenance time for exchange, disposal or the like of the electricity storage device.

Therefore, for example, in a case of adopting a capacitor unit to an electricity storage device, there is known a structure of the electricity storage device that switches discharge control thereof based upon a value of a capacitor voltage for quick discharge at the maintenance time (Patent Document 1).

In addition, when a key switch turns off after the discharging of the electricity storage device and turns on soon thereafter, unexpected charging thereof possibly occurs. Therefore, there is known an electricity storage device configured to prevent this unexpected charging by monitoring an engine speed (Patent Document 2).

Patent Document 1: International Publication WO 2008/111649

Patent Document 2: Japanese Patent Laid-Open No. 2013-169060

SUMMARY

Incidentally, in a case where, for example, a lithium-ion battery is used in the electricity storage device, when the electricity storage device is recharged after being discharged to reach the safety voltage level for disposal, there is a possibility that internal short-cut or the like of the lithium-ion battery occurs. Therefore, it is required to securely prevent the recharging.

On the other hand, Patent Document 2 discloses that the recharging of the capacitor unit is permitted on a condition that a state of an engine operating in a predetermined engine speed or less is maintained for a predetermined time after completion of the discharging of the capacitor unit. Therefore, in a case where the conventional technology disclosed in Patent Document 2 is applied to the lithium-ion battery, there is posed a problem of being unable to prevent the recharging of the electricity storage device after being discharged to reach the safety voltage level.

The present invention is made in view of the aforementioned problem in the conventional technology, and an object of the present invention is to provide a construction machine that can prevent recharging of an electricity storage device in a case where the electricity storage device is discharged to reach a safety voltage level for disposal.

For solving the aforementioned problem, a construction machine according to the present invention comprises:
a hydraulic pump driven by an electric motor;
a working mechanism driven by hydraulic oil delivered from the hydraulic pump;
an inverter that controls the electric motor;
an electricity storage device that is connected to the inverter to perform charging and discharging of electric power; and
a battery controller that controls the charging and the discharging of the electricity storage device based upon a charge/discharge command from a vehicle body controller and stores information of the electricity storage device, characterized in that the battery controller:
in a case of a normal operation, assumes a normal operation mode to permit the charging and the discharging of the electricity storage device;
upon receiving a discharge command from the vehicle body controller for complete discharge of the electricity storage device, assumes a discharge mode to discharge the electricity storage device to reach a safety voltage level and store discharge information; and
upon reading out the discharge information, assumes a discharge prohibition mode to prohibit the charging and the discharging of the electricity storage device.

According to the present invention, in a case where the electricity storage device is discharged to reach the safety voltage level for disposal of the electricity storage device, the discharge information is stored in the battery controller. As a result, the discharge information can be confirmed at the vehicle body operating time. Therefore, the electricity storage device in which the discharge information is recorded in the battery controller can prohibit the charging/discharging to prevent the recharging of the electricity storage device.

DETAILED DESCRIPTION

Hereinafter, an explanation will be in detail made of a hybrid hydraulic excavator taken as an example of a construction machine according to embodiments in the present invention with reference to the accompanying drawings.

Figure 1:
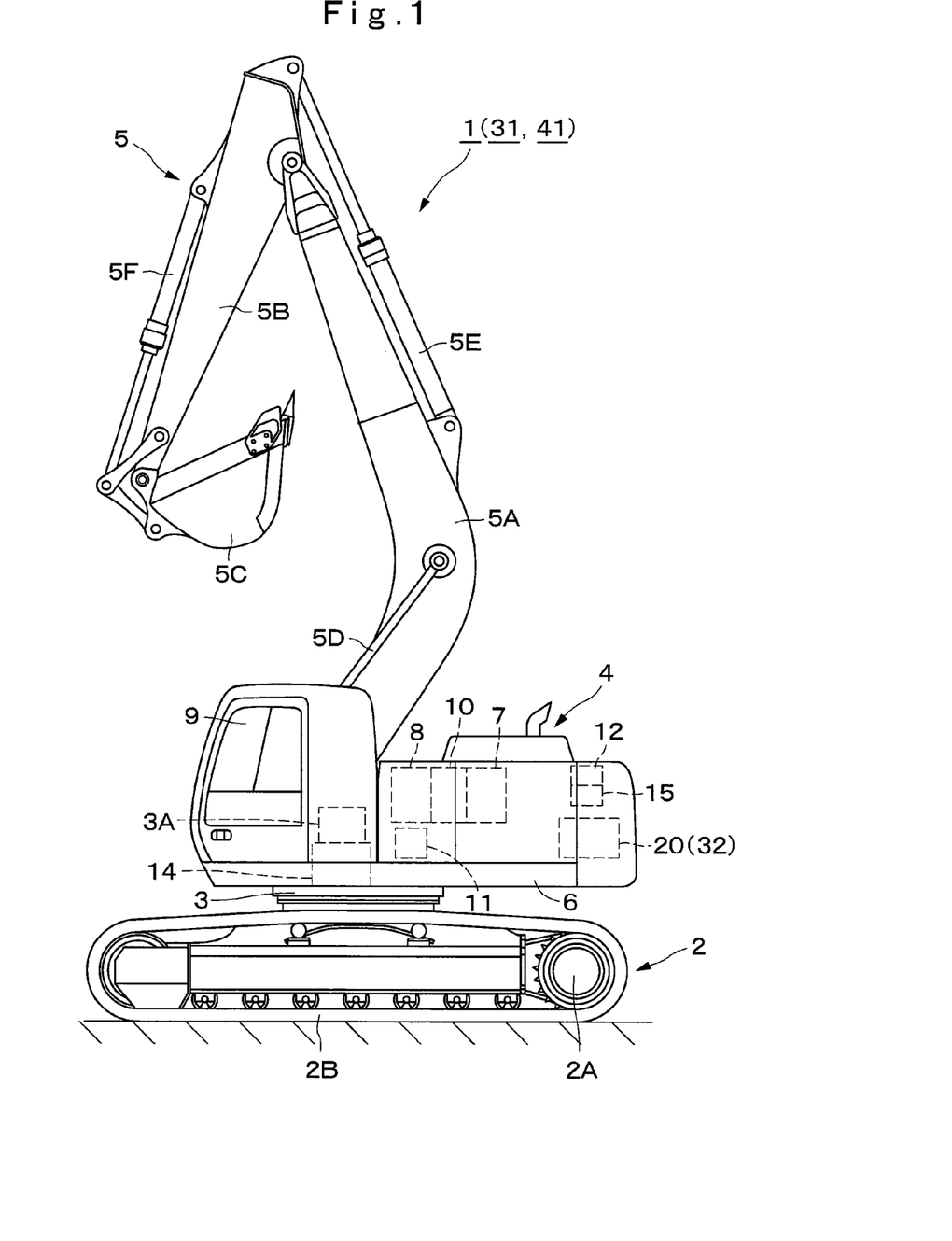
FIG. 1 is a front view showing a hybrid hydraulic excavator according to embodiments of the present invention.
Figure 2:
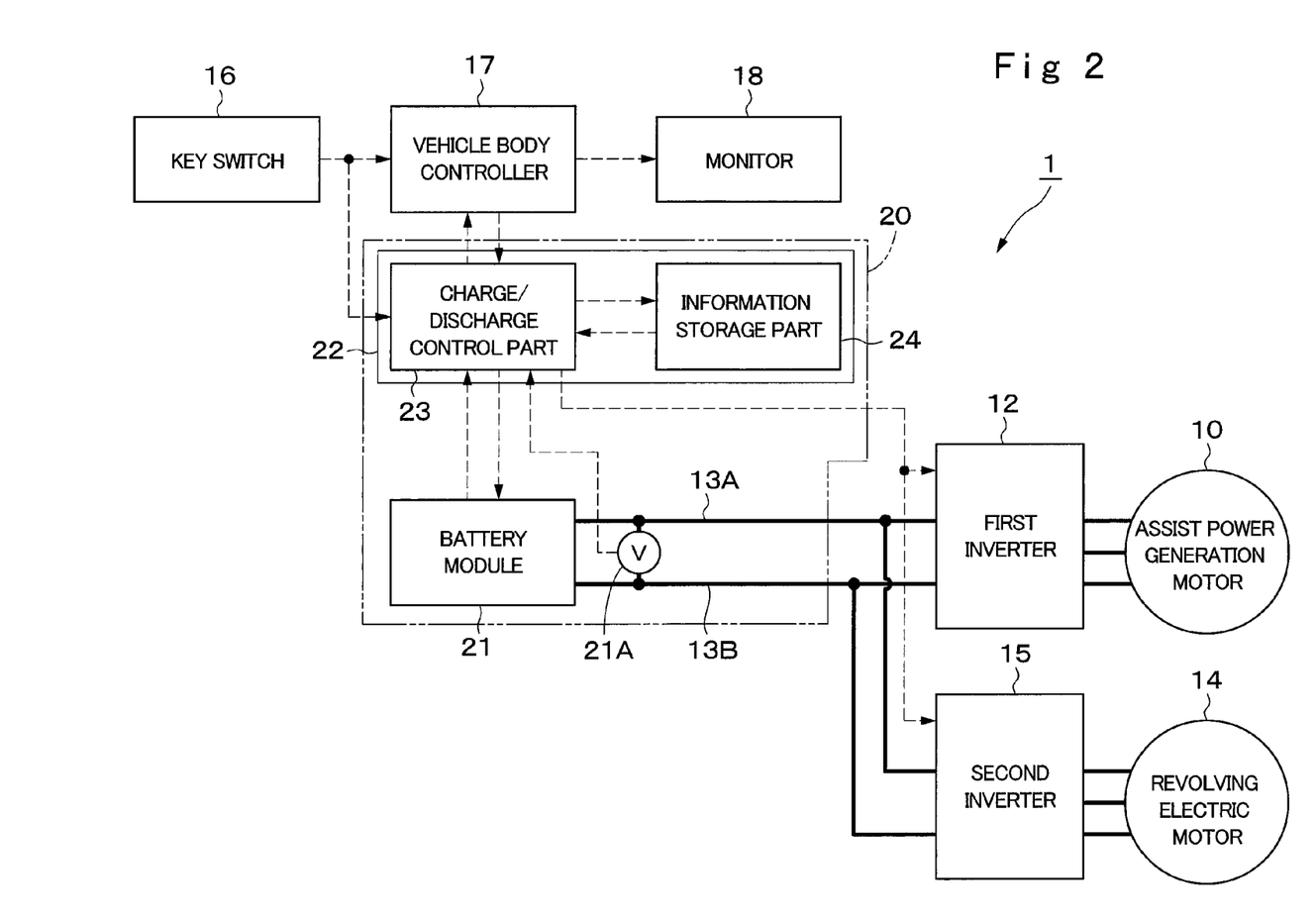
FIG. 2 is a block diagram showing a drive system of a hydraulic excavator according to a first embodiment.

FIG. 1 and FIG. 2 show a hybrid hydraulic excavator 1 according to a first embodiment. As shown in FIG. 1, the hydraulic excavator 1 is provided with an automotive lower traveling structure 2 of a crawler type, an upper revolving structure 4 that is mounted on the lower traveling structure 2 through a revolving device 3 to be capable of revolving thereon, and a working mechanism 5 of an articulated structure that is provided in the front side of the upper revolving structure 4 to perform an excavating operation and the like. The lower traveling structure 2 and the upper revolving structure 4 configure a vehicle body of the hydraulic excavator 1. The lower traveling structure 2 is provided with a hydraulic motor 2A for performing a traveling operation. The revolving device 3 is provided with a hydraulic motor 3A for performing a revolving operation. It should be noted that a lower traveling structure of a crawler type is exemplified as the lower traveling structure 2, but even a lower traveling structure of a wheel type may be adopted.

The working mechanism 5 is operable as a front actuator mechanism. The working mechanism 5 is configured of, for example, a boom 5A, an arm 5B and a bucket 5C, and a boom cylinder 5D, an arm cylinder 5E and a bucket cylinder 5F, which drive the above corresponding components. The working mechanism 5 is attached to a revolving frame 6 of the upper revolving structure 4. The working mechanism 5 is driven by hydraulic oil delivered by a hydraulic pump 8. It should be noted that the working mechanism 5 is not limited to one provided with the bucket 5C, but may be provided with, for example, a grapple or the like.

The upper revolving structure 4 is provided with an engine 7 as an internal combustion engine such as a diesel engine, and the hydraulic pump 8 (a main pump) that is driven by the engine 7. In addition, an assist power generation motor 10 is connected mechanically to the engine 7. Therefore, the hydraulic pump 8 is driven by the assist power generation motor 10 as well. The hydraulic pump 8 delivers the hydraulic oil. The lower traveling structure 2, the upper revolving structure 4 and the working mechanism 5 operate independently from each other by this hydraulic oil.

Specifically, the lower traveling structure 2 drives a pair of crawlers 2B (only one of them is shown in FIG. 1) by delivery of the hydraulic oil from the hydraulic pump 8 to the traveling hydraulic motor 2A. The upper revolving structure 4 drives the revolving device 3 by delivery of the hydraulic oil from the hydraulic pump 8 to the revolving hydraulic motor 3A. The cylinders 5D to 5F expand or contract by delivery of the hydraulic oil from the hydraulic pump 8 thereto. Thereby, the working mechanism 5 performs lifting and tilting operations to perform a work such as an excavating operation or a land leveling operation. In addition, the upper revolving structure 4 is provided with a cab 9. An operator gets on the cab 9 and controls the hydraulic excavator 1.

Next, an explanation will be made of a drive system of an electric system in the hydraulic excavator 1 with reference to FIG. 2. In FIG. 2, the assist power generation motor 10 is coupled mechanically to the engine 7. The assist power generation motor 10 and the engine 7 drive the hydraulic pump 8 as a hydraulic generator. Therefore, the assist power generation motor 10 configures an electric motor that drives the hydraulic pump 8. The hydraulic oil delivered from the hydraulic pump 8 is distributed in a control valve 11, based upon an operation by the operator. As a result, the boom cylinder 5D, the arm cylinder 5E, the bucket cylinder 5F, the traveling hydraulic motor 2A and the revolving hydraulic motor 3A are driven by the hydraulic oil delivered from the hydraulic pump 8.

The assist power generation motor 10 plays two roles of power generation of performing power supply to a battery module 21 by acting as a power generator using the engine 7 as a power source, and power running of assisting in the engine 7 and the drive of the hydraulic pump 8 by acting as a motor using the electric power from the battery module 21 as a power source. Accordingly, when the assist power generation motor 10 drives as the motor, the assist power generation motor 10 is driven by the electric power of the battery module 21.

The assist power generation motor 10 is connected via a first inverter 12 as a power converter to a pair of DC buses 13A, 13B (DC cables) at a positive electrode side and at a negative electrode side. The first inverter 12 is configured using a plurality of switching elements such as transistors and insulating gate bipolar transistors (IGBT). The first inverter 12 controls the assist power generation motor 10.

At the power generation time of the assist power generation motor 10, the first inverter 12 converts AC power from the assist power generation motor 10 into DC power, which is supplied to the battery module 21. At the power running time of the assist power generation motor 10, the first inverter 12 converts the DC power of the DC buses 13A, 13B into AC power, which is supplied to the assist power generation motor 10.

The revolving electric motor 14 is driven by the electric power from the assist power generation motor 10 or the battery module 21. The revolving electric motor 14 is configured of, for example, a three-phase induction motor, and is disposed on the upper revolving structure 4 together with the hydraulic motor 3A. The revolving electric motor 14 drives the revolving device 3 in cooperation with the hydraulic motor 3A.

The revolving electric motor 14 is connected via a second inverter 15 to the DC buses 13A, 13B. The revolving electric motor 14 plays two roles of power running of driving by receiving the electric power from the battery module 21 or the assist power generation motor 10, and regeneration of storing electric power in the battery module 21 by generating the electric power with extra torque at the revolving braking time. The second inverter 15 is configured of a plurality of switching elements, as similar to the first inverter 12. The second inverter 15 controls the revolving electric motor 14.

A key switch 16 has a drive position (an ON position) for driving the assist power generation motor 10 and a stop position (an OFF position)) for stopping the assist power generation motor 10. When the key switch 16 turns on, it outputs a vehicle body activation signal to a vehicle body controller 17 and a battery unit 20. When the key switch 16 turns off, it stops the output of the activation signal.

The vehicle body controller 17 outputs a torque command to the first inverter 12 and the second inverter 15. In a case of a normal operation, the vehicle body controller 17 outputs a charge/discharge command to a battery controller 22 (a charge/discharge control part 23) in the battery unit 20 for charging or discharging the battery module 21. On the other hand, for example, in a case of disposing of the battery unit 20, the vehicle body controller 17 outputs a discharge command to the battery controller 22 (the charge/discharge control part 23) in the battery unit 20 for complete discharge of the battery module 21.

The vehicle body controller 17 causes a monitor 18 to display a state of the battery unit 20. The assist power generation motor 10 is connected via the first inverter 12 to the battery module 21. The assist power generation motor 10 assists in the hydraulic pump 8 and performs the charging to the battery module 21 in response to the torque command outputted from the vehicle body controller 17. The revolving electric motor 14 is connected via the second inverter 15 to the battery module 21. The revolving electric motor 14 assists in the hydraulic motor 3A at the revolving operation time of the upper revolving structure 4 and performs the charging to the battery module 21 by regeneration braking in response to the torque command outputted from the vehicle body controller 17.

Next, an explanation will be made of a specific configuration of the battery unit 20 with reference to FIG. 2. The battery unit 20 is provided with the battery module 21 and the battery controller 22.

The battery module 21 is connected to the first inverter 12 to configure an electricity storage device performing charging and discharging of electric power. The battery module 21 is provided with a plurality of cells (not shown) each having a lithium-ion secondary battery. The battery module 21 is configured of an assembled battery provided with a plurality of cells series-connected to each other. A terminal of the battery module 21 at a positive electrode side is connected to the DC bus 13A at a positive electrode side. A terminal of the battery module 21 at a negative electrode side is connected to the DC bus 13B at a negative electrode side. The battery module 21 is charged by electrical charges supplied from the assist power generation motor 10. The battery module 21 discharges by supplying electrical charges to the assist power generation motor 10 and the revolving electric motor 14. The permission and the prohibition regarding the charging and discharging of the battery module 21 are controlled by the charge/discharge control part 23.

A voltage detector 21A is connected to both ends of the battery module 21. The voltage detector 21A detects a voltage V (a battery voltage) between both the ends of the battery module 21. The voltage detector 21A outputs the voltage V to the charge/discharge control part 23.

The battery controller 22 controls the charging and the discharging of the battery module 21 based upon a charge/discharge command from the vehicle body controller 17 and stores discharge information of the battery module 21. The battery controller 22 is provided with the charge/discharge control part 23 that controls the charging and the discharging of the battery module 21 based upon the charge/discharge command from the vehicle body controller 17, and an information storage part 24 that stores the discharge information of the battery module 21.

The battery controller 22 is provided with three operation modes composed of a normal operation mode, a discharge mode and a charge/discharge prohibition mode. The battery controller 22 assumes the normal operation mode in a case of a normal operation. The battery controller 22 permits the charging and the discharging of the battery module 21 in the normal operation mode. Specifically, in the normal operation mode the battery controller 22 permits the charging and the discharging of the battery module 21 by the charge/discharge control part 23.

The battery controller 22 assumes the discharge mode upon receiving the discharge command from the vehicle body controller 17. In the discharge mode the battery controller 22 discharges the battery module 21 to reach the safety voltage level and stores the discharge information. Specifically, in the discharge mode the battery controller 22 discharges the battery module 21 to reach the safety voltage level by the charge/discharge control part 23 and stores the discharge information in the information storage part 24.

The battery controller 22, upon reading out the stored discharge information, assumes the charge/discharge prohibition mode. The battery controller 22 prohibits the charging and the discharging of the battery module 21 in the charge/discharge prohibition mode. Specifically, in the charge/discharge prohibition mode the battery controller 22 prohibits the charging and the discharging of the battery module 21 by the charge/discharge control part 23.

The charge/discharge control part 23 is configured of a microcomputer, for example. An input part of the charge/discharge control part 23 is connected to the key switch 16, the vehicle body controller 17, the battery module 21, the voltage detector 21A and the information storage part 24. An output part of the charge/discharge control part 23 is connected to the inverters 12, 15, the vehicle body controller 17, the battery module 21 and the information storage part 24.

Figure 3:
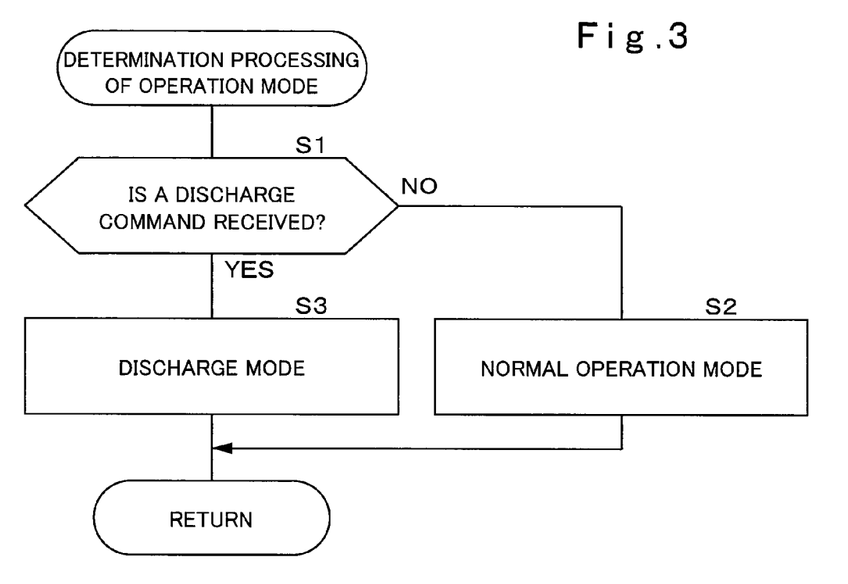
FIG. 3 is a flow chart showing determination processing of an operation mode.

The charge/discharge control part 23 executes a program of determination processing in the operation mode as shown in FIG. 3. That is, in a case of not receiving the discharge command from the vehicle body controller 17, the charge/discharge control part 23 executes a normal operation mode process. In this case, the charge/discharge control part 23 permits the charging and the discharging of the battery module 21. The charge/discharge control part 23 controls the charging and the discharging of the battery module 21 based upon the charge/discharge command from the vehicle body controller 17.

Upon receiving the discharge command from the vehicle body controller 17, the charge/discharge control part 23 executes a discharge mode process. In this case, the charge/discharge control part 23 executes a program of discharge mode processing as shown FIG. 4. At this time, the charge/discharge control part 23 discharges electrical charges of the battery module 21.

Figure 4:
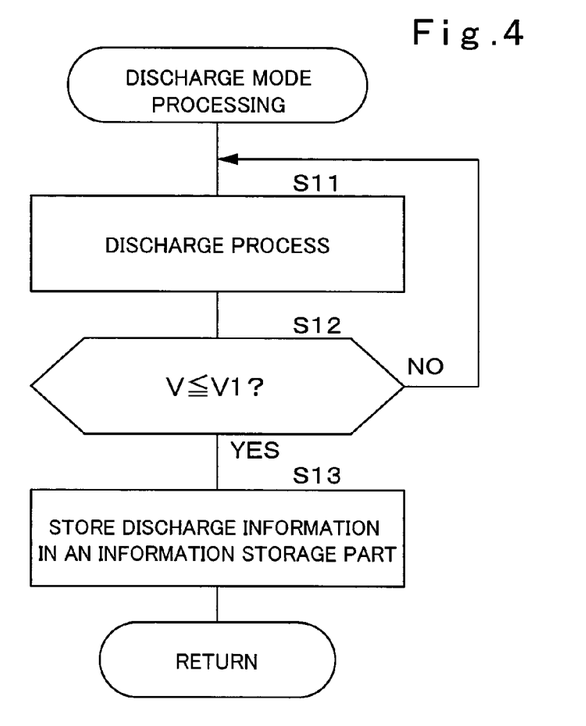
FIG. 4 is a flow chart showing discharge mode processing.

Specifically, the charge/discharge control part 23 discharges the electrical charges of the battery module 21, for example, via the first inverter 12 to the assist power generation motor 10. It should be noted that the charge/discharge control part 23 may discharge the electrical charges of the battery module 21, for example, via the second inverter 15 to the revolving electric motor 14. The charge/discharge control part 23 compares a voltage V of the battery module 21 with a specified value V1 as a safety voltage. The charge/discharge control part 23 continues the discharging in a case where the voltage V is larger than the specified value V1. The charge/discharge control part 23 stops the discharging in a case where the voltage V is equal to or less than the specified value V1. At this time, the charge/discharge control part 23 causes information storage part 24 to store the discharge information. In addition to it, the charge/discharge control part 23 informs the vehicle body controller 17 of the discharge information.

Figure 5:
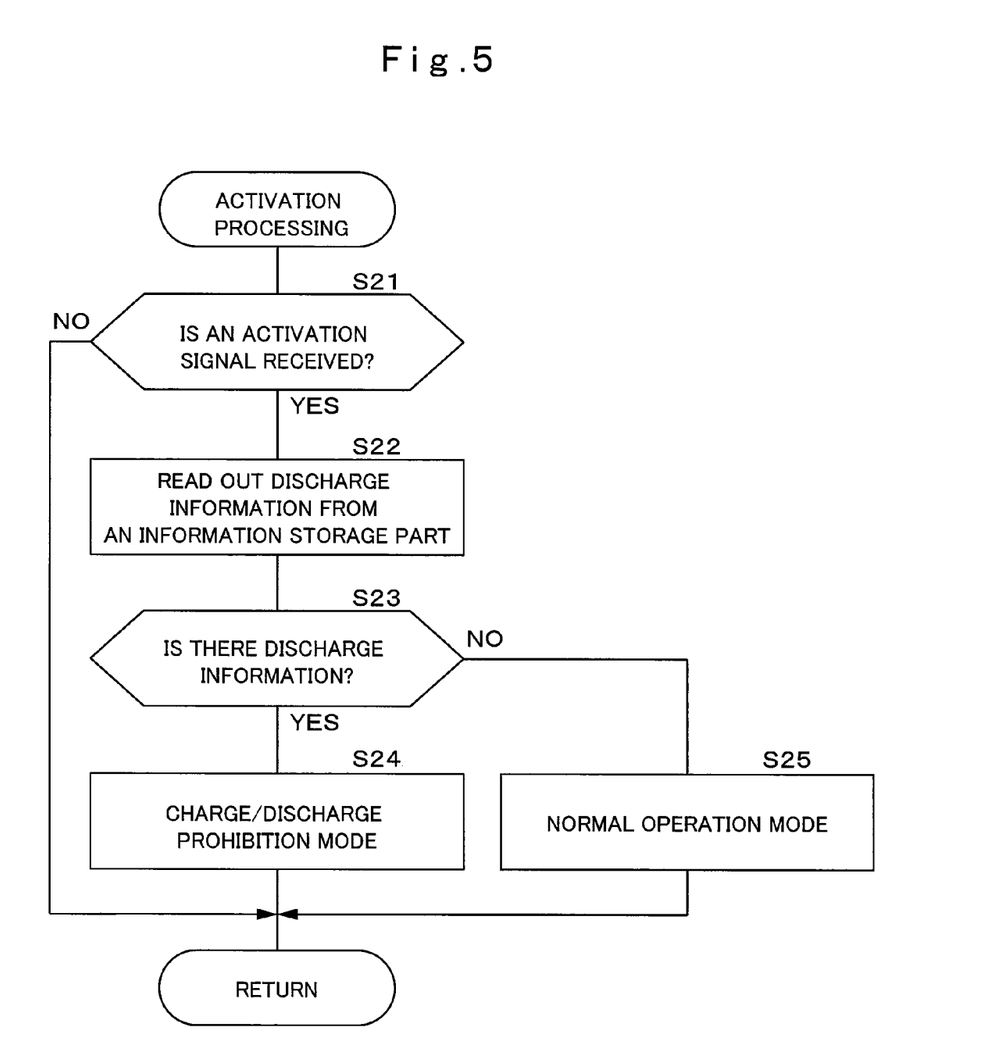
FIG. 5 is a flow chart showing activation processing.

In addition, the charge/discharge control part 23 executes a program of activation processing as shown FIG. 5 at the activation time of the hydraulic excavator 1. That is, the charge/discharge control part 23 receives an activation signal from the key switch 16. At this time, the charge/discharge control part 23 reads in the discharge information from the information storage part 24. In a case where the discharge information is stored in the information storage part 24, the charge/discharge control part 23 executes a charge/discharge prohibition mode process. That is, the charge/discharge control part 23 prohibits the charging and the discharging of the battery module 21. In addition to it, the charge/discharge control part 23 informs the vehicle body controller 17 of the discharge information. Thereby, the vehicle body controller 17 causes the monitor 18 to display the discharge information.

On the other hand, in a case where the discharge information is not stored in the information storage part 24, the charge/discharge control part 23 executes the normal mode process. That is, the charge/discharge control part 23 permits the charging and the discharging of the battery module 21. The charge/discharge control part 23 charges or discharges the battery module 21 as usual based upon a charge/discharge command from the vehicle body controller 17.

The information storage part 24 is configured of a non-volatile memory, for example. The information storage part 24 is connected to the charge/discharge control part 23. The discharge information is deleted from the information storage part 24 at an initial state. When the charge/discharge control part 23 completes the discharge process, the charge/discharge control part 23 outputs the discharge information to the information storage part 24. As a result, the information storage part 24 stores the discharge information at the time the discharge process is completed.

Next, an explanation will be made of the determination processing of the operation mode with reference to FIG. 3. The determination processing of the operation mode is repeatedly executed in a predetermined control cycle.

In step S1, the charge/discharge control part 23 determines whether or not a discharge command is received from the vehicle body controller 17. In a case where the discharge command is not received in the charge/discharge control part 23, "NO" is determined in step S1, and the process goes to step S2. In step S2, the battery controller 22 assumes a normal operation mode to permit the charging and the discharging of the battery module 21. As a result, the charge/discharge control part 23 controls the charging and the discharging of the battery module 21 based upon a charge/discharge command from the vehicle body controller 17.

On the other hand, in a case where the discharge command is received in the charge/discharge control part 23, "YES" is determined in step S1, and the process goes to step S3. In step S3, the battery controller 22 switches from the normal operation mode to a discharge mode. At this time, the battery controller 22 executes discharge mode processing shown in FIG. 4.

Next, an explanation will be made of the discharge mode processing by the battery controller 22 with reference to FIG. 4.

First, in step S11, the charge/discharge control part 23 controls the first inverter 12 to cause electrical charges of the battery module 21 to be discharged to the assist power generation motor 10. At this time, the electrical charges of the battery module 21 may be discharged to the revolving electric motor 14.

In subsequent step S12, the charge/discharge control part 23 compares a voltage V of the battery module 21 with a specified value V1 as a safety voltage. At this time, the specified value V1 is, for example, a voltage to the extent of not electrifying a worker and is in advance determined experimentally. In a case (V>V1) where the voltage V is larger than the specified value V1, in step S12 "NO" is determined, and the process goes back to step S11, wherein the discharging of the battery module 21 continues to be performed. On the other hand, in a case (V≤V1) where the voltage V is equal to or less than the specified value V1, since the voltage V is reduced to reach the safety voltage level, in step S12 "YES" is determined, and the process goes to step S13. In step S13, the battery controller 22 causes the information storage part 24 to store the discharge information. In addition to it, the charge/discharge control part 23 informs the vehicle body controller 17 of the discharge information.

Next, an explanation will be made of the activation processing by the battery controller 22 with reference to FIG. 5. The activation processing is repeatedly executed in a predetermined control cycle.

First, in step S21, the charge/discharge control part 23 determines whether or not an activation signal of the vehicle body is received from the key switch 16. In a case where the activation signal is not received in the charge/discharge control part 23, "NO" is determined in step S21, and the process returns as it is.

On the other hand, in a case where the activation signal is received in the charge/discharge control part 23, "YES" is determined in step S21, and the process goes to step S22. In step S22, the charge/discharge control part 23 reads in the discharge information from the information storage part 24. At this time, the charge/discharge control part 23 informs the vehicle body controller 17 of the read discharge information.

In subsequent step S23, it is determined whether or not the discharge information is stored in the information storage part 24. In a case where the discharge information is stored in the information storage part 24, "YES" is determined in step S23, and the process goes to step S24. In step S24, the battery controller 22 assumes the charge/discharge prohibition mode to prohibit the charging and discharging of the battery module 21 by the charge/discharge control part 23. Thereby, the recharging of the battery module 21 is prevented. At this time, the vehicle body controller 17 displays the discharge information on the monitor 18. An operator can recognize that the recharging of the battery module 21 is impossible by visually confirming the monitor 18.

On the other hand, in a case where the discharge information is not stored in the information storage part 24, "NO" is determined in step S23, and the process goes to step S25. In step S25, the battery controller 22 assumes the normal operation mode to permit the charging and discharging of the battery module 21. Thereby, the charge/discharge control part 23 controls the charging and the discharging of the battery module 21 based upon a charge/discharge command from the vehicle body controller 17.

Figure 6:
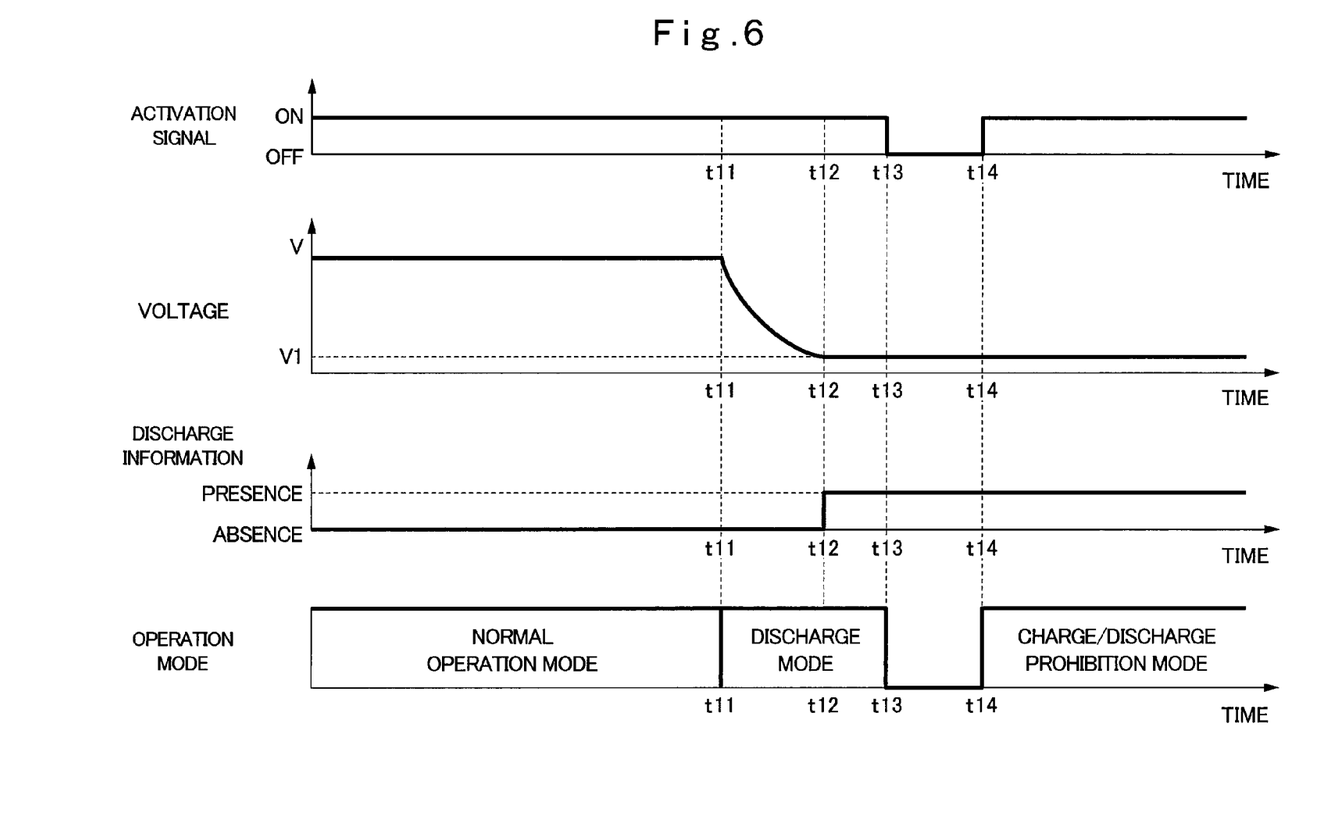
FIG. 6 is a time chart showing a change over time in an activation signal, a voltage, discharge information and an operation mode.

An explanation will be made of specific contents of the charge/discharge processing and the activation processing according to the present embodiment with reference to FIG. 6. FIG. 6 shows a change over time in the activation signal of the vehicle body, the voltage V of the battery module 21, the discharge information and the operation mode.

The battery controller 22 assumes the normal operation mode in a case of the normal operation. That is, in a case where the discharge command is not received in the battery controller 22 and the discharge information is not stored in the information storage part 24, the battery controller 22 assumes the normal operation mode.

The charge/discharge control part 23 receives the discharge command from the vehicle body controller 17 at time t11 when the battery controller 22 is operating in the normal operation mode. At this time point, the operation mode of the battery controller 22 switches from the normal operation mode to the discharge mode. Thereby, the charge/discharge control part 23 starts the discharging of the battery module 21. The voltage V of the battery module 21 gradually reduces through the discharge process by the charge/discharge control part 23. At time t12, the voltage V of the battery module 21 becomes equal to or less than a specified value V1. At this time, the charge/discharge control part 23 stores the discharge information in the information storage part 24 and completes the discharge process. After that, the key switch 16 is operated to switch the activation signal of the vehicle body from ON to OFF. As a result, the battery controller 22 ends the discharge mode at time t13 when OFF of the activation signal is recognized.

At time t14 after completion of the discharge mode, when the key switch 16 is operated from OFF to ON, the vehicle body is again activated. At this time, the charge/discharge control part 23 receives the activation signal from the key switch 16. When the charge/discharge control part 23 receives the activation signal, the charge/discharge control part 23 reads out the discharge information from the information storage part 24. At this time, since the discharge information is stored in the information storage part 24, the battery controller 22 assumes the charge/discharge prohibition mode to prohibit the charging and the discharging of the battery module 21 by the charge/discharge control part 23. As a result, the recharging to the battery module 21 is prevented.

In this way, according to the first embodiment, the battery controller 22 assumes the normal operation mode in a case of the normal operation to permit the charging and the discharging of the battery module 21 by the charge/discharge control part 23. At this time, the charge/discharge control part 23 controls the charging and the discharging of the battery module 21 based upon the charge/discharge command from the vehicle body controller 17. Thereby, for example, the assist power generation motor 10 can be caused to execute the power running operation and the power generation operation.

In addition, in a case where the battery controller 22 receives a discharge command from the vehicle body controller 17 for completely discharging the battery module 21, the battery controller 22 assumes the discharge mode to discharge the battery module 21 to reach the safety voltage level by the charge/discharge control part 23 and store the discharge information to the information storage part 24. As a result, the battery module 21 assumes a disposable state by a reduction in the voltage V. In addition to it, since the discharge information is stored in the information storage part 24, the discharge state of the battery module 21 can easily be confirmed by reading out the discharge information.

Upon reading out the discharge information from the information storage part 24, the battery controller 22 assumes the charge/discharge prohibition mode to prohibit the charging and the discharging of the battery module 21 by the charge/discharge control part 23. In this way, the battery controller 22 can confirm presence/absence of the discharge information at the vehicle body operating time. Therefore, the battery controller 22 can prevent the recharging to the battery module 21 in which the discharge information is stored in the information storage part 24.

In addition, the battery module 21 and the battery controller 22 configure the exchangeable battery unit 20. Therefore, in a case of removing the battery unit 20 from the vehicle body for disposal of the battery module 21, the battery controller 22 is attached to the removed battery unit 20. At this time, the discharge information is stored in the information storage part 24 in the battery controller 22. Even in a case where the battery unit 20 provided with the battery module 21 to be disposed of is attached to the vehicle body in error, the recharging of the battery module 21 can be prevented based upon the discharge information at the time of activating the vehicle body.

In addition, the hydraulic excavator 1 is provided with the monitor 18 for displaying the discharge information. Therefore, an operator can easily recognize that the charging and the discharging of the battery module 21 are prohibited, with visual confirmation of the monitor 18.

Figure 7:
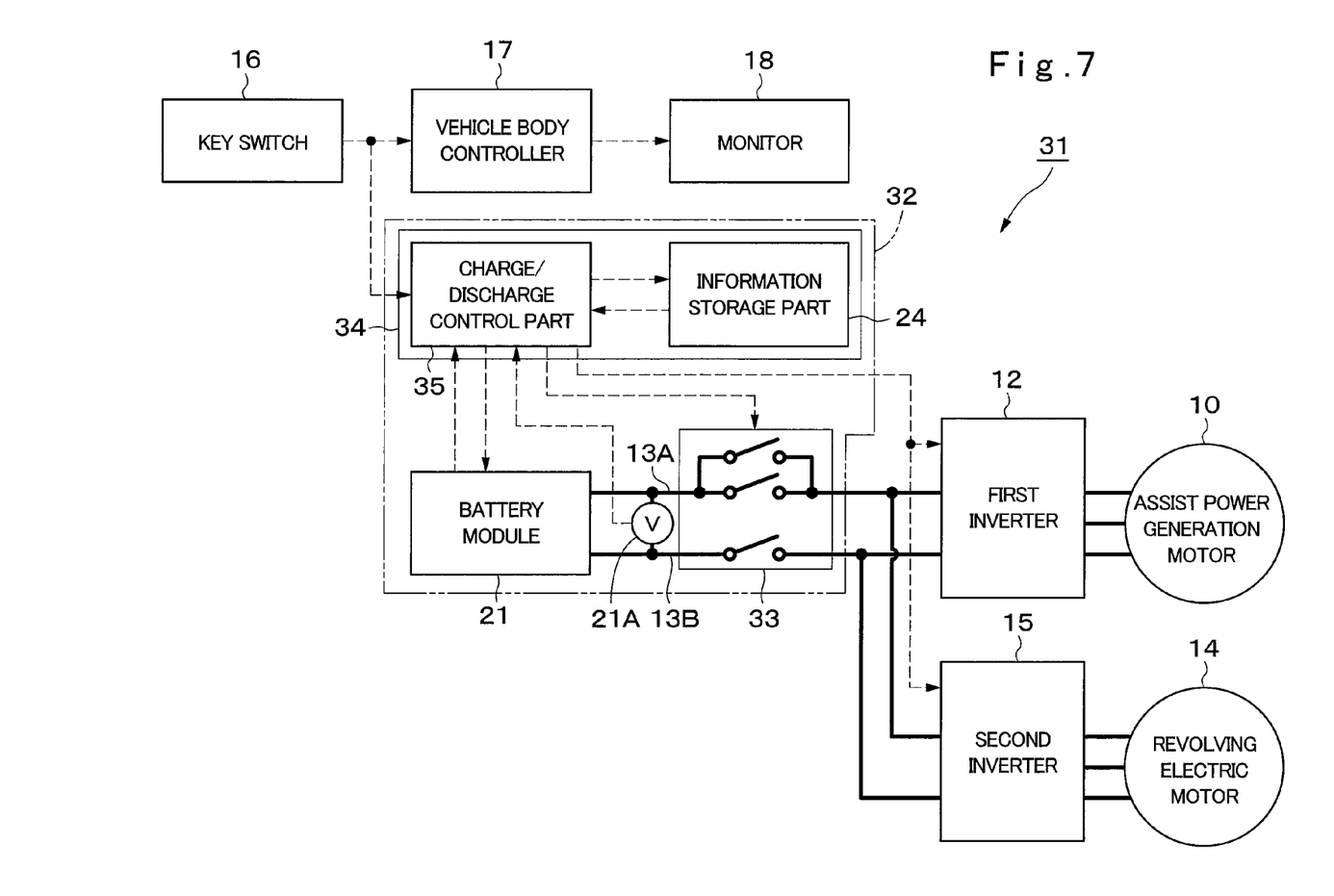
FIG. 7 is a block diagram showing a drive system of a hydraulic excavator according to a second embodiment.
Figure 8:
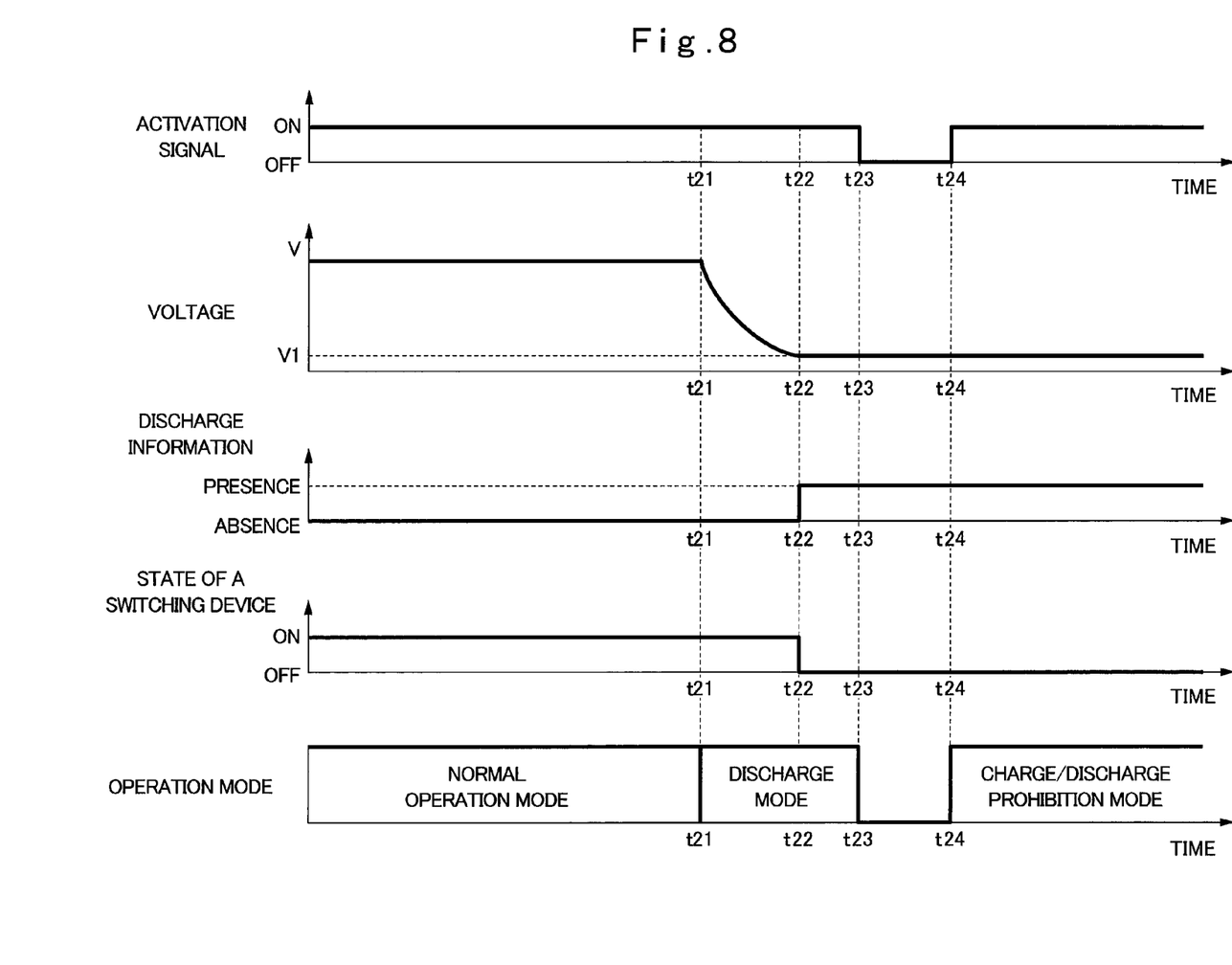
FIG. 8 is a time chart showing a change over time in an activation signal, a voltage, discharge information, a state of a switching device and an operation mode.

Next, an explanation will be made of a second embodiment according to the present invention with reference to FIG. 7 and FIG. 8. The second embodiment is characterized in that a battery controller blocks between an inverter and a battery module using a switching device in a charge/discharge prohibition mode. It should be noted that in the second embodiment, components identical to those in the first embodiment will be referred to as identical reference numerals, and the explanation is omitted.

A hydraulic excavator 31 according to the second embodiment is provided with a battery unit 32. The battery unit 32 is, as similar to the battery unit 20 according to the first embodiment, provided with the battery module 21 and a battery controller 34. In addition to it, the battery unit 32 is provided with a switching device 33 for connecting or blocking electrically between the first inverter 12 and the battery module 21.

The switching device 33 is disposed between the battery module 21 and the DC buses 13A, 13B. The switching device 33 is configured of, for example, a relay. The switching device 33 is regularly in a blockade state. The switching device 33 assumes a connection state with supply of exciting current thereto from a charge/discharge control part 35. That is, the switching device 33 is controlled to assume the connection state and the blockade state by the charge/discharge control part 35 in the battery controller 34. When the battery controller 34 is in a normal operation mode or in a discharge mode, the switching device 33 assumes the connection state. On the other hand, when the battery controller 34 is in a charge/discharge prohibition mode, the switching device 33 assumes the blockade state. It should be noted that the switching device 33 is not limited to the relay but may be configured of a various-type switch controllable by the charge/discharge control part 35.

The battery controller 34 is, as similar to the battery controller 22 according to the first embodiment, provided with the charge/discharge control part 35 and the information storage part 24. The charge/discharge control part 35 is configured as similar to the charge/discharge control part 23 according to the first embodiment. The charge/discharge control part 35, however, controls the connection state and the blockade state of the switching device 33. In terms of this point, the charge/discharge control part 35 differs from the charge/discharge control part 23 according to the first embodiment.

The battery controller 34 (the charge/discharge control part 35), as similar to the battery controller 22 according to the first embodiment, executes the determination processing as shown in FIG. 3, the discharge processing as shown in FIG. 4 and the activation processing as shown in FIG. 5.

However, in a case where the battery controller 34 assumes the charge/discharge prohibition mode in step S24 in FIG. 5, the switching device 33 is switched from the connection state to the blockade state by the charge/discharge control part 35. Thereby, the charging and discharging of the battery module 21 is prohibited by the charge/discharge control part 23 to prevent the recharging of the battery module 21. At this time, the vehicle body controller 17 causes the monitor 18 to display the discharge information.

On the other hand, in a case where the battery controller 34 assumes the normal operation mode in step S25 in FIG. 5, the switching device 33 is held in the connection state by the charge/discharge control part 35. Thereby, the charging and the discharging of the battery module 21 are permitted, and the charge/discharge control part 35 controls the charging and the discharging of the battery module 21 based upon a charge/discharge command from the vehicle body controller 17.

An explanation will be made of specific contents of the charge/discharge processing and the activation processing according to the present embodiment with reference to FIG. 8. FIG. 8 shows a change over time in an activation signal of the vehicle body, a voltage V of the battery module 21, discharge information, a state of the switching device 33 and an operation mode.

The battery controller 34 assumes the normal operation mode in a case of the normal operation. At this time, the battery controller 34 controls the switching device 33 to assume the connection state by the charge/discharge control part 35.

The charge/discharge control part 35 receives a discharge command from the vehicle body controller 17 at time t21 when operating in the normal operation mode. Thereby, the charge/discharge control part 35 starts the discharging of the battery module 21. At this time point, the operation mode of the battery controller 34 switches from the normal operation mode to the discharge mode. The voltage V of the battery module 21 gradually reduces through the discharge processing by the charge/discharge control part 35. At time t22, the voltage V of the battery module 21 becomes equal to or less than a specified value V1. At this time, the charge/discharge control part 35 stores the discharge information in the information storage part 24 and completes the discharge processing. After that, the key switch 16 is operated to switch the activation signal of the vehicle body from ON to OFF. As a result, at time t23 when OFF of the activation signal is recognized, the battery controller 34 ends the discharge mode and switches the switching device 33 from the connection state to the blockade state.

At time t24 after completion of the discharge mode, when the key switch 16 is operated from OFF to ON, the vehicle body is again activated. At this time, the charge/discharge control part 35 receives the activation signal from the key switch 16. When the charge/discharge control part 35 receives the activation signal, the charge/discharge control part 35 reads out the discharge information from the information storage part 24. At this time, since the discharge information is stored in the information storage part 24, the battery controller 34 assumes the charge/discharge prohibition mode to hold the blockade state of the switching device 33. Thereby, the charging and the discharging of the battery module 21 are prohibited. As a result, the recharging to the battery module 21 is prevented.

As a result, the second embodiment as configured in this way also can achieve an operational effect as substantially similar to that of the first embodiment. In addition, the battery unit 32 is provided with the switching device 33 that connects or disconnects electrically between the first inverter 12 and the battery module 21, and the battery controller 34 blocks between the first inverter 12 and the battery module 21 using the switching device 33 in the charge/discharge prohibition mode. Thereby, in a case where the battery module 21 is completely discharged, it is possible to prohibit the charging and the discharging of the battery module 21 by the switching device 33.

Figure 9:
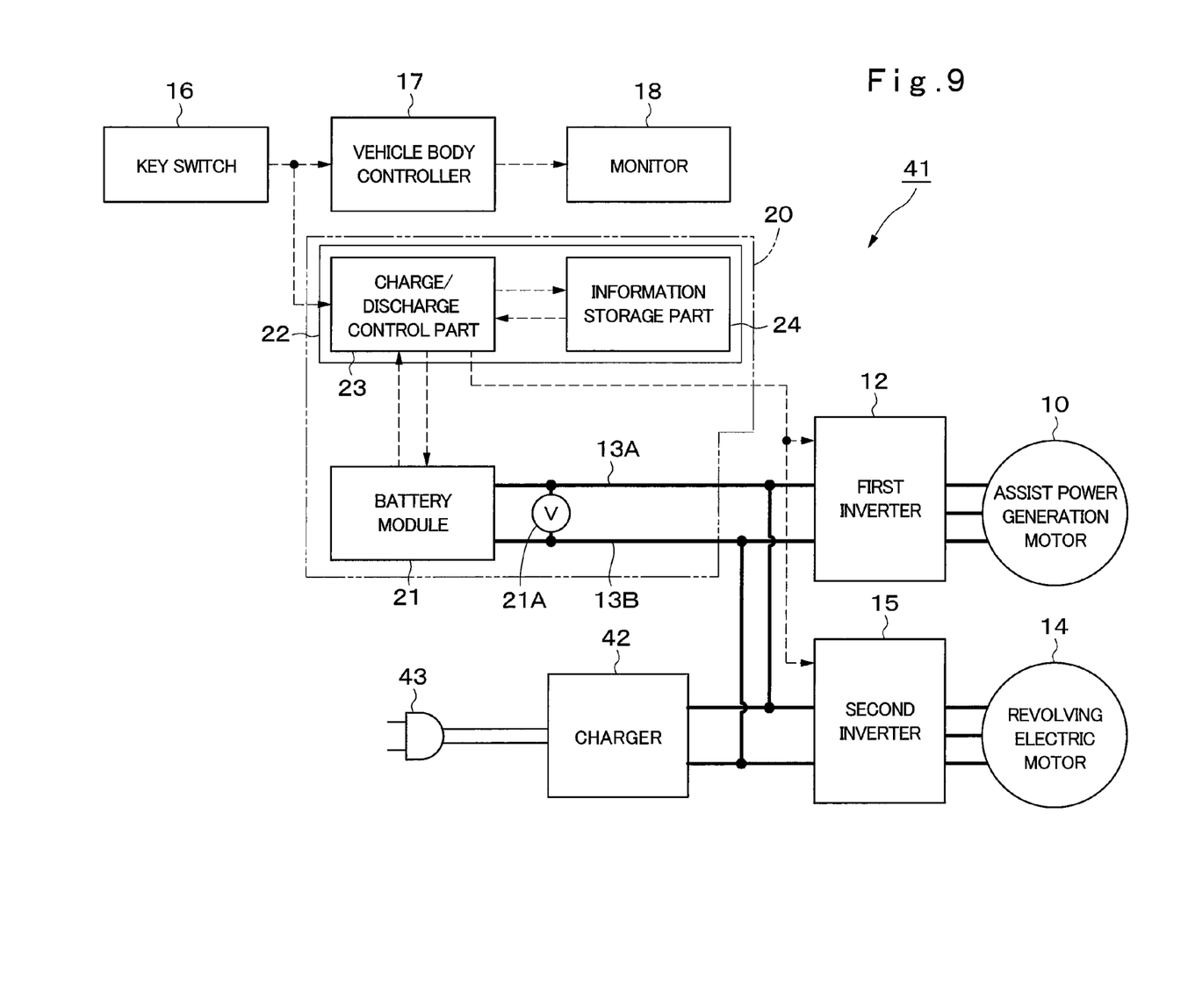
FIG. 9 is a block diagram showing a drive system of an electric hydraulic excavator according to a modification example.

It should be noted that the first embodiment is explained by taking the hybrid hydraulic excavator 1 provided with the engine 7, the assist power generation motor 10 and the battery unit 20 as an example. The present invention is not limited thereto, but may be, as a modification example shown in FIG. 9, applied to an electric hydraulic excavator 41. In this case, the hydraulic excavator 41 is provided with a charger 42 for charging the battery unit 20 from an exterior with an engine removed. The charger 42 is connected to the DC buses 13A, 13B. The charger 42 has an external power source connecting terminal 43 for connection to an external power source such as a commercial power source. The charger 42 supplies electric power supplied from the external power source connecting terminal 43 to the battery unit 20 to charge the battery module 21 in the battery unit 20. This structure can be applied to the second embodiment as well.

Each of the embodiments is explained by taking the battery module 21 composed of the lithium-ion secondary battery as an example of the electricity storage device. The present invention is not limited thereto, but the electricity storage device may be a secondary battery composed of another material or may be a capacitor.

In each of the embodiments, the assist power generation motor 10 and the revolving electric motor 14 are configured to be connected to the battery unit 20. The present invention is not limited thereto, but only the assist power generation motor 10 may be connected to the battery unit 20 with the revolving electric motor 14 removed. This structure can be applied to the second embodiment as well.

In each of the embodiment, the hydraulic excavators 1, 31 are explained as an example of the construction machine. The present invention is not limited thereto but may be applied to various construction machines such as a wheel loader.

Each of the embodiments is shown just as the example, and without mentioning, partial replacement or combinations of the components as shown in the different embodiments are made possible.

DESCRIPTION OF REFERENCE NUMERALS 1, 31, 41 Hydraulic Excavator (Construction Machine)
5 Working Mechanism
8 Hydraulic Pump
10 Assist Power Generation Motor (Electric Motor)
12 First Inverter (Inverter)
14 Revolving Electric Motor
16 Key Switch
17 Vehicle Body Controller
18 Monitor
20, 32 Battery Unit
21 Battery Module (Electricity Storage Device)
22, 34 Battery Controller
23, 35 Charge/Discharge Control Part
24 Information Storage Part
33 Switching Device

The invention claimed is:

1. A construction machine comprising:
a hydraulic pump driven by an electric motor;
a working mechanism driven by hydraulic oil delivered from the hydraulic pump;
an inverter that controls the electric motor;
a key switch that outputs an activation signal to drive the electric motor;
an electricity storage device that is connected to the inverter to perform charging and discharging of electric power; and
a battery controller that controls the charging and the discharging of the electricity storage device based upon a charge/discharge command from a vehicle body controller and includes a memory that stores discharge information of the electricity storage device, wherein
the electricity storage device and the battery controller form an exchangeable battery unit, and
the battery controller:
in a case of a normal operation, assumes a normal operation mode to permit the charging and the discharging of the electricity storage device;
upon receiving a discharge command from the vehicle body controller for complete discharge of the electricity storage device, assumes a discharge mode to discharge the electricity storage device to reach a safety voltage level and store the discharge information in the memory;

upon receiving the activation signal from the key switch and reading out the discharge information from the memory, assumes a charge/discharge prohibition mode to prohibit the charging and the discharging of the electricity storage device; and upon receiving the activation signal from the key switch and the discharge information is not stored in the memory, assumes the normal operation mode to permit the charging and the discharging of the electricity storage device.

2. The construction machine according to claim 1, further comprising:

a switching device that connects or disconnects electrically between the inverter and the electricity storage device, wherein the battery controller in the charge/discharge prohibition mode holds the blockade state of the switching device and blocks electrically between the inverter and the electricity storage device.

3. The construction machine according to claim 1, further comprising:

a monitor for displaying the discharge information.

\* \* \* \* \*